US011492569B2

(12) United States Patent
Park et al.

(10) Patent No.: US 11,492,569 B2
(45) Date of Patent: *Nov. 8, 2022

(54) COMPOSITION OF EXTERNAL LUBRICANT FOR COLD PILGERING

(71) Applicants: KEPCO NUCLEAR FUEL CO., LTD., Daejeon (KR); SHL CO., LTD., Gangwon-do (KR)

(72) Inventors: Min Young Park, Sejong-si (KR); Sang Jin Han, Daejeon (KR); Ki Bum Park, Daejeon (KR); Ho Yeon Hwang, Daejeon (KR); Min Sung Kwon, Daejeon (KR); Kyung Tae Kim, Gyeonggi-do (KR); Pyeong Mo Yeo, Gangwon-do (KR); Jeong Jin Jang, Gangwon-do (KR); Sang Soon Choi, Gangwon-do (KR)

(73) Assignees: KEPCO NUCLEAR FUEL CO., LTD., Daejeon (KR); SHL CO., LTD., Gangwon-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/118,928

(22) Filed: Dec. 11, 2020

(65) Prior Publication Data
US 2021/0238497 A1 Aug. 5, 2021

(30) Foreign Application Priority Data
Feb. 3, 2020 (KR) .......... 10-2020-0012548

(51) Int. Cl.
*C10M 173/00* (2006.01)
*C10M 101/02* (2006.01)
(Continued)

(52) U.S. Cl.
CPC ...... *C10M 173/00* (2013.01); *C10M 101/025* (2013.01); *C10M 125/10* (2013.01);
(Continued)

(58) Field of Classification Search
CPC ............. C10M 173/00; C10M 169/04; C10M 129/08; C10M 141/08; C10M 135/10;
(Continued)

(56) References Cited

U.S. PATENT DOCUMENTS 2,286,433 A 6/1942 Montgomery
2,908,648 A * 10/1959 Kroll ................. C10M 1/08
508/508
(Continued)

FOREIGN PATENT DOCUMENTS

CN 106433926 A 2/2017
CN 108315087 A 7/2018
(Continued)

OTHER PUBLICATIONS ip.com Search History (Year: 2021).*
(Continued)

*Primary Examiner* — Pamela H Weiss
(74) *Attorney, Agent, or Firm* — Reinhart Boerner Van Deuren P.C.

(57) ABSTRACT

Disclosed is a composition of a lubricant for cold pilgering of zirconium alloy tubes. More particularly, disclosed is a composition of an external lubricant for cold pilgering of a zirconium alloy cladding tube, the composition exhibiting excellent lubricity and decomposition against microbes.

6 Claims, 6 Drawing Sheets

(51) Int. Cl.
*C10M 125/10* (2006.01)
*C10M 127/02* (2006.01)
*C10M 129/08* (2006.01)
*C10M 135/10* (2006.01)
*C10M 135/36* (2006.01)
*C10M 141/08* (2006.01)
*C10M 169/04* (2006.01)
*C10N 40/20* (2006.01)
*C10N 30/06* (2006.01)
*C10N 40/24* (2006.01)

(52) U.S. Cl.
CPC ........ *C10M 127/02* (2013.01); *C10M 129/08* (2013.01); *C10M 135/10* (2013.01); *C10M 135/36* (2013.01); *C10M 141/08* (2013.01); *C10M 169/04* (2013.01); C10M 2201/02 (2013.01); C10M 2201/062 (2013.01); C10M 2203/003 (2013.01); C10M 2203/022 (2013.01); C10M 2203/1006 (2013.01); C10M 2207/022 (2013.01); C10M 2219/044 (2013.01); C10M 2219/104 (2013.01); C10N 2030/06 (2013.01); C10N 2040/24 (2013.01); C10N 2040/243 (2020.05)

(58) Field of Classification Search
CPC ........ C10M 127/02; C10M 2203/1006; C10M 2201/062; C10M 2207/022; C10M 2201/02; C10M 2219/044; C10M 2203/003; C10M 2203/022; C10M 2219/104; C10M 135/36; C10M 2207/40; C10M 2207/125; C10M 2205/18; C10M 143/00; C10M 101/025; C10M 125/10; C10M 163/00; C10M 2201/06; C10M 2201/061; C10M 2201/08; C10M 2203/00; C10M 159/06; C10N 2040/243; C10N 2030/06; C10N 2040/24; C10N 2040/244; C10N 2030/16; C10N 2010/04; C10N 2010/02

See application file for complete search history.

(56) References Cited

U.S. PATENT DOCUMENTS

| | | | |
|---|---|---|---|
| 3,031,749 A | 5/1962 | Adams | |
| 2003/0220205 A1* | 11/2003 | Manka | C10M 171/00 |
| | | | 508/154 |
| 2016/0312145 A1* | 10/2016 | Nishida | C10M 101/025 |

FOREIGN PATENT DOCUMENTS

| | | | | |
|---|---|---|---|---|
| EP | 0612834 A1 | | 8/1994 | |
| EP | 1344801 A1 | * | 9/2003 | ............ C08L 91/005 |
| GB | 449592 A | | 6/1936 | |
| GB | 691241 A | * | 5/1953 | .............. C10M 5/00 |
| JP | 2010065133 A | * | 3/2010 | |
| JP | 2013199563 A | * | 10/2013 | |
| KR | 10-0873944 B1 | | 12/2008 | |
| WO | WO-2006046970 A1 | * | 5/2006 | ........ C10M 101/025 |

OTHER PUBLICATIONS

The Structural Constituents of Carnauba Wax Vandenburg Wilder AOCS Meeting New Orleans Apr. 1970 pp. 514-518 Journal of American Oil Chemists Society vol. 47 (Year: 1970).*

* cited by examiner

| 4-BALL Test Condition | | comparative example | example | | | | | | | processing conditions: 10 water 1 (external oil) dilution |
|---|---|---|---|---|---|---|---|---|---|---|
| | | 0.0 | 0.8 | 1.0 | 1.2 | 1.4 | 1.6 | 1.8 | 2.0 | |
| EP (kgf/cm²) | 40°C, 10 sec at 1760 rpm | 126 PASS | 250 PASS | 250 PASS | 250 PASS | 250 PASS | 250 PASS | 250 PASS | 250 PASS | |
| Wear (mm) | 75°C, 30 min, 50 kg at 1200 rpm | 1.35 | 1.10 | 1.05 | 0.90 | 0.88 | 0.88 | 0.90 | 0.92 | |
| Wear | | | | | | | | | | |

: critical significance

FIG. 4

COMPOSITION OF EXTERNAL LUBRICANT FOR COLD PILGERING

CROSS REFERENCE TO RELATED APPLICATION

The present application claims priority to Korean Patent Application No. 10-2020-0012548, filed Feb. 3, 2020, the entire contents of which is incorporated herein for all purposes by this reference.

BACKGROUND OF THE INVENTION

Field of the Invention

The present invention relates generally to composition of a lubricant for cold pilgering of zirconium alloy tubes. More particularly, the present invention relates to a composition of an external lubricant for cold pilgering of a zirconium alloy cladding tube, the composition exhibiting excellent lubricity and rot resistance.

Description of the Related Art

In a nuclear fuel assembly, cladding tubes serve to protect $UO_2$ sintered pellets by separating the $UO_2$ sintered pellets from cooling water in a core, and prevent radioactive fission products generated from the $UO_2$ sintered pellets from being released into the cooling water, and also separate the cooling water and the $UO_2$ sintered pellets from each other to prevent prevents chemical reactions therebetween. As a material of the cladding tube, a zirconium alloy having good corrosion resistance to high-temperature cooling water and low neutron absorption properties is used.

A manufacturing process of a general cladding tube involves: removing hafnium (Hf) from zirconium ore; adding several alloy elements to prepare an ingot; subjecting the ingot to hot extrusion to prepare a tube reduced extrusion (TREX); subjecting the TREX to cold working called pilgering and heat treatment repeatedly to reduce the thickness and diameter of the TREX, thereby manufacturing zirconium alloy tubes for nuclear fuel.

Cooling lubricants, which are used in shaping the dimensions of zirconium alloy tubes that are frequently used as nuclear fuel cladding tubes and structural materials in nuclear power plants, are used in conjunction with a special method called cold pilgering, which is distinct from manufacture of stainless steel pipes or copper alloy pipes for general industry. In order to control the crystallographic texture of the zirconium alloy, the reduction rate of the cross-sectional area for each pilgering step has to be equal to or greater than approximately 70%, and thus a high load is applied to dies, a mandrel, and a tube. Accordingly, properties such as wear resistance and extreme pressure resistance are required.

When cooling lubricants lack these properties, this may promote wear of the dies that influence the quality and dimensions of the outer surface of the tube and the mandrel that influences the quality and dimensions of the inner surface of the tube, causing defects on the inner and outer surfaces of the tube, which may significantly affect life time of the dies and mandrel.

Here, in cold pilgering, a dedicated lubricant is used to remove heat generated due to friction and lubrication through oil film formation between the dies, the mandrel, and the tube. However, an existing lubricant cannot exert a sufficient effect when applied to the cladding tube due to outer surface defects due to friction, reduction in life time of the dies, and the like.

Additionally, in external cooling lubricants, animal oil and fat are used as base oil, and due to the characteristics of mixing with water, rotting is inevitable. Due to the rotting over time, stability of lubrication quality may be reduced, and odor and harmful substances may be generated, resulting in deterioration of work safety.

Therefore, minimizing quality deviation by minimizing deterioration of the degree of rotting over time has a great influence on securing product quality stability.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and an objective of the present invention is to provide a composition of a lubricant for cold pilgering of a Zirconium alloy tube and, more particularly, to provide a composition of an external lubricant for cold pilgering of a Zirconium alloy tube, the composition exhibiting improved lubricity and decomposition against microbes.

In order to achieve the above objective, according to one aspect of the present invention, there is provided a composition of a lubricant for cold pilgering, the composition including: a base oil; a lubricity enhancer; an anti-wear agent; and anti-decomposition agent, wherein the lubricity enhancer may be a vegetable wax and may be included in an amount of 2.2 to 2.6% by weight.

The vegetable wax may be Brazil wax.

The anti-wear agent may be included in an amount of 0.6 to 1.0% by weight.

The anti-decomposition agent may be included in an amount of 0.8 to 1.2% by weight.

The anti-wear agent may include at least one selected from benzenesulfonic acid, $C_{10}$ to $C_{16}$ alkyl groups, calcium salts, sulfuric acid, and $C_{16}$ to $C_{24}$ alkyl derivatives.

The anti-decomposition agent may include at least one selected from 1,2-benzisothiazolin-3-one, potassium hydroxide, sodium hydroxide, ethylene glycol, and dihydrogen oxide.

The present invention can provide a composition of a lubricant for outer surface of tube during cold pilgering, the composition exhibiting excellent decomposition against microbes thus being capable of long-term use and storage without deterioration in performance due to decomposing, and exhibiting excellent lubricity.

BRIEF DESCRIPTION OF THE DRAWINGS

The above and other objectives, features, and other advantages of the present invention will be more clearly understood from the following detailed description when taken in conjunction with the accompanying drawings, in which:

FIG. 4 is a photograph illustrating results of a 4-ball test for lubricants according to Comparative Example and Examples;

DETAILED DESCRIPTION OF THE INVENTION

Figure 1:
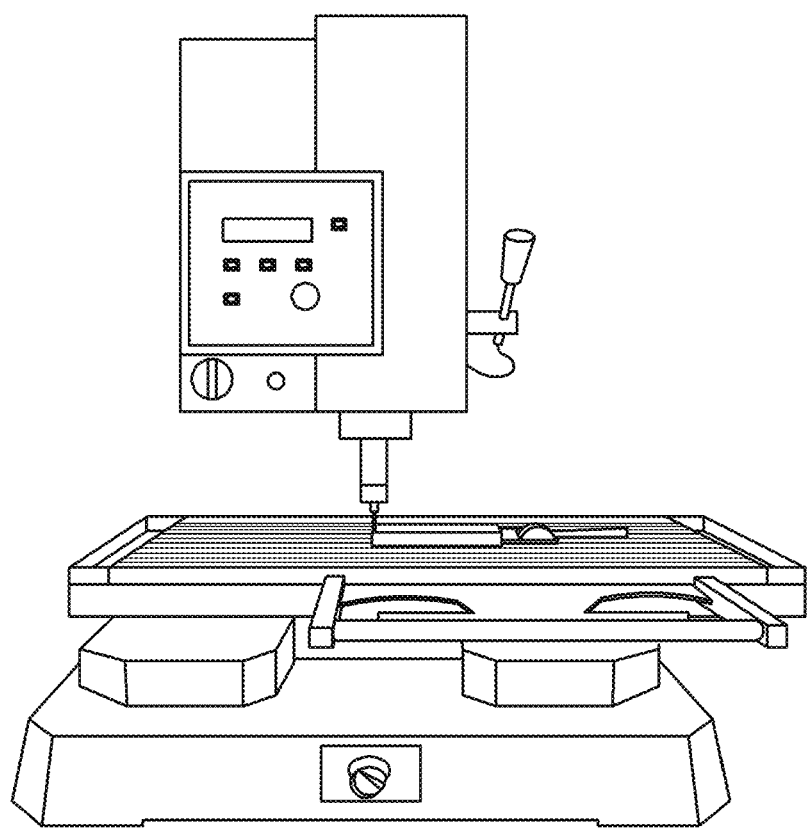
FIG. 1 is a photograph illustrating a micro-tapping torque test machine for measuring lubricity of lubricants.
Figure 2:
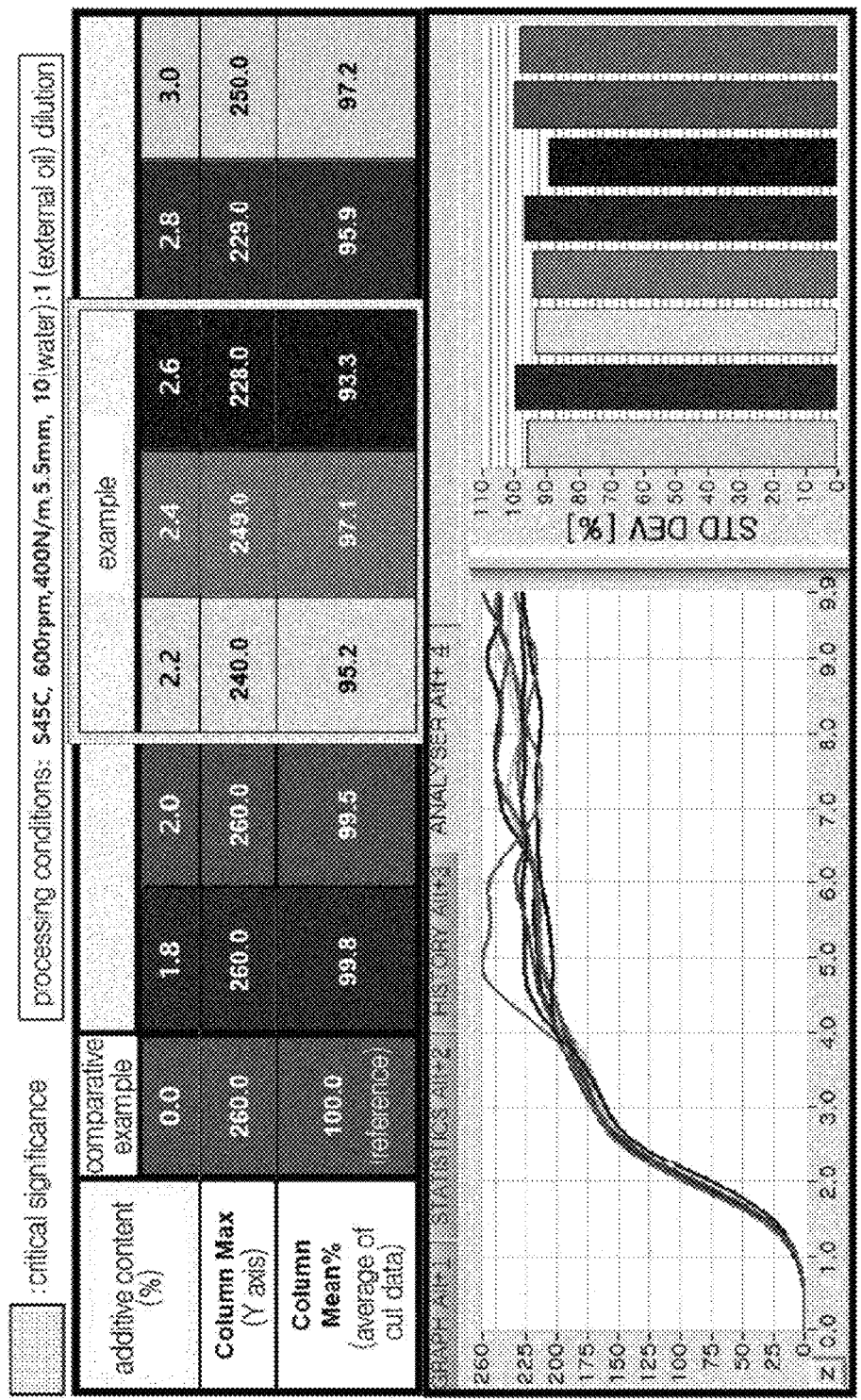
FIG. 2 is a view illustrating data of results of measuring the lubricity of the lubricants using the micro-tapping torque test machine.
Figure 3:
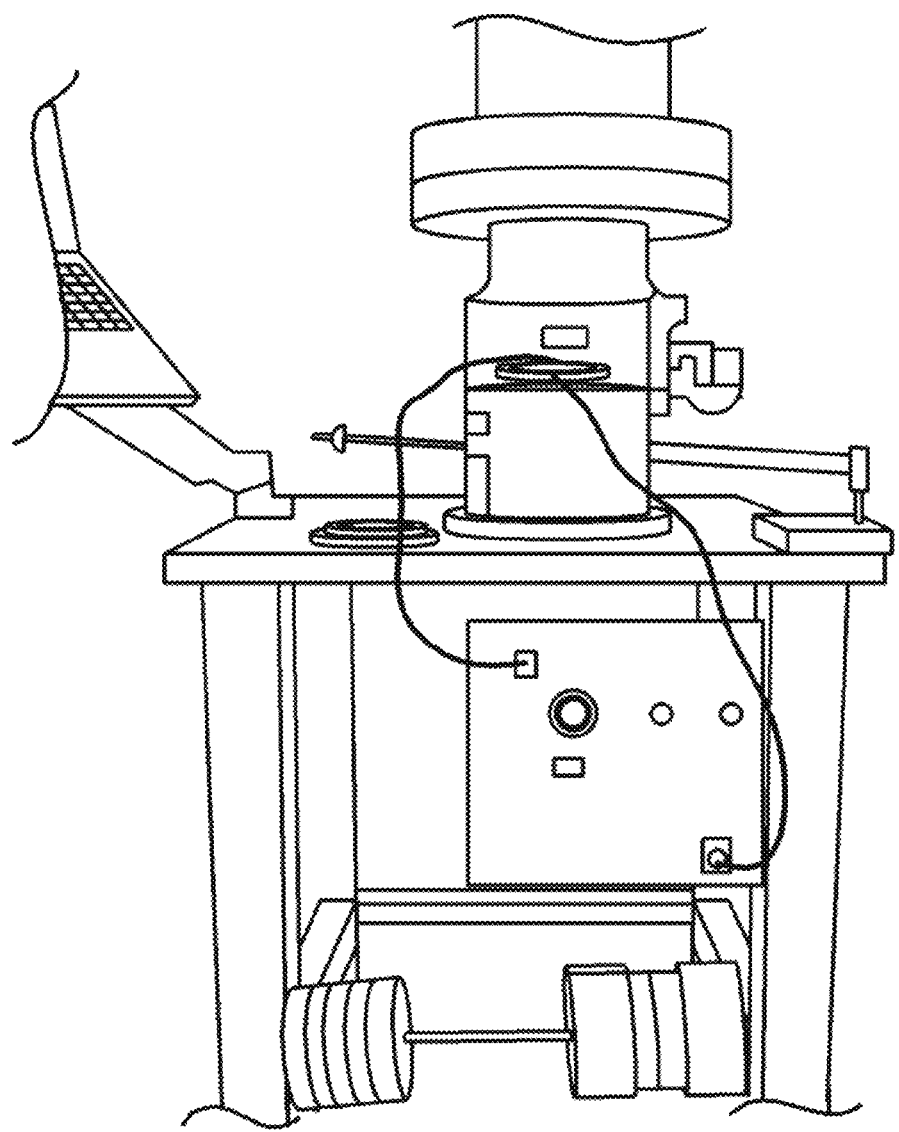
FIG. 3 is a photograph illustrating a 4-ball test machine for measuring extreme pressure resistance and wear resistance of lubricants.

Hereinafter, the present invention will be described in detail with reference to examples. However, these examples are merely exemplary and are not intended to limit the present invention.

Comparative Example 1 and Examples 1 to 7—Lubricity Enhancer

TABLE 1

|  |  | Comparative Example | Example | | | | | | |
|---|---|---|---|---|---|---|---|---|---|
|  |  | 1 | 1 | 2 | 3 | 4 | 5 | 6 | 7 |
| Water |  | 57.2 | 55.4 | 55.2 | 55 | 54.8 | 54.6 | 54.4 | 54.2 |
| Base oil |  | 8.5 | 8.5 | 8.5 | 8.5 | 8.5 | 8.5 | 8.5 | 8.5 |
| Fatty acid |  | 16 | 16 | 16 | 16 | 16 | 16 | 16 | 16 |
| PH enhancer |  | 4.7 | 4.7 | 4.7 | 4.7 | 4.7 | 4.7 | 4.7 | 4.7 |
| Viscosity modifier |  | 4.0 | 4.0 | 4.0 | 4.0 | 4.0 | 4.0 | 4.0 | 4.0 |
| Lubricity enhancer | A1 | 0 | 1.8 | 2.0 | 2.2 | 2.4 | 2.6 | 2.8 | 3.0 |
| Anti-wear agent | A2 | 1.2 | 1.2 | 1.2 | 1.2 | 1.2 | 1.2 | 1.2 | 1.2 |
| Anti-decomposition agent | A3 | 0.8 | 0.8 | 0.8 | 0.8 | 0.8 | 0.8 | 0.8 | 0.8 |
| Other additives | A4 | 7.6 | 7.6 | 7.6 | 7.6 | 7.6 | 7.6 | 7.6 | 7.6 |

(Unit: % by weight)
A1: Brazil wax
A2: Mixture of benzenesulfonic acid, C10-16-alkyl derivs., and calcium salts
A3: Mixture of 1,2-benzisothiazolin-3-one, potassium hydroxide, sodium hydroxide, ethylene glycol, and dihydrogen oxide.
A4: Corrosion inhibitor, natural animal fat, animal fatty acid ester, and other additives Comparative Example 2 and Examples 8 to 14—Anti-Wear Agent

TABLE 2

|  |  | Comparative Example | Example | | | | | | |
|---|---|---|---|---|---|---|---|---|---|
|  |  | 2 | 8 | 9 | 10 | 11 | 12 | 13 | 14 |
| Water |  | 56.2 | 55.4 | 55.2 | 55.0 | 54.8 | 54.6 | 54.4 | 54.2 |
| Base oil |  | 8.5 | 8.5 | 8.5 | 8.5 | 8.5 | 8.5 | 8.5 | 8.5 |
| Fatty acid |  | 16 | 16 | 16 | 16 | 16 | 16 | 16 | 16 |
| PH enhancer |  | 4.7 | 4.7 | 4.7 | 4.7 | 4.7 | 4.7 | 4.7 | 4.7 |
| Viscosity modifier |  | 4.0 | 4.0 | 4.0 | 4.0 | 4.0 | 4.0 | 4.0 | 4.0 |
| Lubricity enhancer | A1 | 2.2 | 2.2 | 2.2 | 2.2 | 2.2 | 2.2 | 2.2 | 2.2 |
| Anti-wear agent | A2 | 0 | 0.8 | 1.0 | 1.2 | 1.4 | 1.6 | 1.8 | 2.0 |
| Anti-decomposition agent | A3 | 0.8 | 0.8 | 0.8 | 0.8 | 0.8 | 0.8 | 0.8 | 0.8 |
| Other additives | A4 | 7.6 | 7.6 | 7.6 | 7.6 | 7.6 | 7.6 | 7.6 | 7.6 |

(Unit: % by weight)

Comparative Example 3 and Examples 15 to 21—Anti-Decomposition Agent

TABLE 3

|  |  | Comparative Example | Example | | | | | | |
|---|---|---|---|---|---|---|---|---|---|
|  |  | 3 | 15 | 16 | 17 | 18 | 19 | 20 | 21 |
| Water |  | 55.8 | 55.4 | 55.2 | 55.0 | 54.8 | 54.6 | 54.4 | 54.2 |
| Base oil |  | 8.5 | 8.5 | 8.5 | 8.5 | 8.5 | 8.5 | 8.5 | 8.5 |
| Fatty acid |  | 16 | 16 | 16 | 16 | 16 | 16 | 16 | 16 |
| PH enhancer |  | 4.7 | 4.7 | 4.7 | 4.7 | 4.7 | 4.7 | 4.7 | 4.7 |
| Viscosity modifier |  | 4.0 | 4.0 | 4.0 | 4.0 | 4.0 | 4.0 | 4.0 | 4.0 |
| Lubricity enhancer | A1 | 2.2 | 2.2 | 2.2 | 2.2 | 2.2 | 2.2 | 2.2 | 2.2 |
| Anti-wear agent | A2 | 1.2 | 1.2 | 1.2 | 1.2 | 1.2 | 1.2 | 1.2 | 1.2 |
| Anti-decomposition agent | A3 | 0 | 0.4 | 0.6 | 0.8 | 1.0 | 1.2 | 1.4 | 1.6 |
| Other additives | A4 | 7.6 | 7.6 | 7.6 | 7.6 | 7.6 | 7.6 | 7.6 | 7.6 |

(Unit: % by weight)

Experimental Example 1—Measurement of Lubricity and Extreme Pressure Performance Measurement of lubricity and extreme pressure performance was performed under conditions of S45C, 600 rpm, 400 N/m, 5.5 mm using a micro-tapping torque test machine. The smaller the value of column max, the smaller the friction and resistance with the machine, and it can be seen that the lubricity and extreme pressure performance were increased. Column mean % is a value indicating the average of data when one product is designated as 100, and it can be seen that the lubricity and extreme pressure performance were relatively decreased when exceeded 100. The experiment was conducted using Comparative Example 1 and Examples 1 to 7, and the results are shown in the table below.

TABLE 4

|  | Comparative Example 1 | Example1 | Example2 | Example3 | Example4 | Example5 | Example6 | Example7 |
|---|---|---|---|---|---|---|---|---|
| Column MAX(Y axis) | 260.0 | 260.0 | 260.0 | 240.0 | 249.0 | 228.0 | 229.0 | 250.0 |
| Column Mean % | 100.0 | 99.8 | 99.5 | 95.2 | 97.1 | 93.3 | 95.9 | 97.2 |

Through comparison of Comparative example and Examples, it can be seen that when vegetable wax is added, the extreme pressure performance and lubricity were increased. Additionally, through comparison of Examples, it can be seen that the extreme pressure performance and lubricity were significantly increased when the vegetable wax was added in an amount of equal to or greater than 2.2, and the extreme pressure resistance and lubricity were significantly reduced when the vegetable wax was added in an amount of equal to or greater than 2.6.

Experimental Example 2—Measurement of Wear Resistance

Measurement of wear resistance was performed for 30 minutes under conditions of 75° C., 1200 rpm, and 50 kg using a 4-ball test machine, and the results are shown in the table below.

TABLE 5

|  | Comparative Example 2 | Example 8 | Example 9 | Example 10 | Example 11 | Example 12 | Example 13 | Example 14 |
|---|---|---|---|---|---|---|---|---|
| Wear scar value(mm) | 1.35 | 1.10 | 1.05 | 0.90 | 0.88 | 0.88 | 0.90 | 0.92 |

The smaller the wear scar (mm), the smaller the wear rate. Through comparison of Comparative Example and Examples in the table above, it can be seen that the wear resistance was increased when an anti-wear agent was added. Additionally, it can be seen that the wear rate was significantly reduced when a wetting additive was added in an amount of 1.2% by weight, and the wear rate was increased again when the wetting additive was added in an amount of equal to or greater than at 1.6% by weight.

Experimental Example 3—Measurement of Anti-Decomposition Performance

Figure 5:
FIG. 5 is a photograph illustrating results of bacteria/fungi measurement of lubricants according to Comparative Example and Examples.
Figure 6:
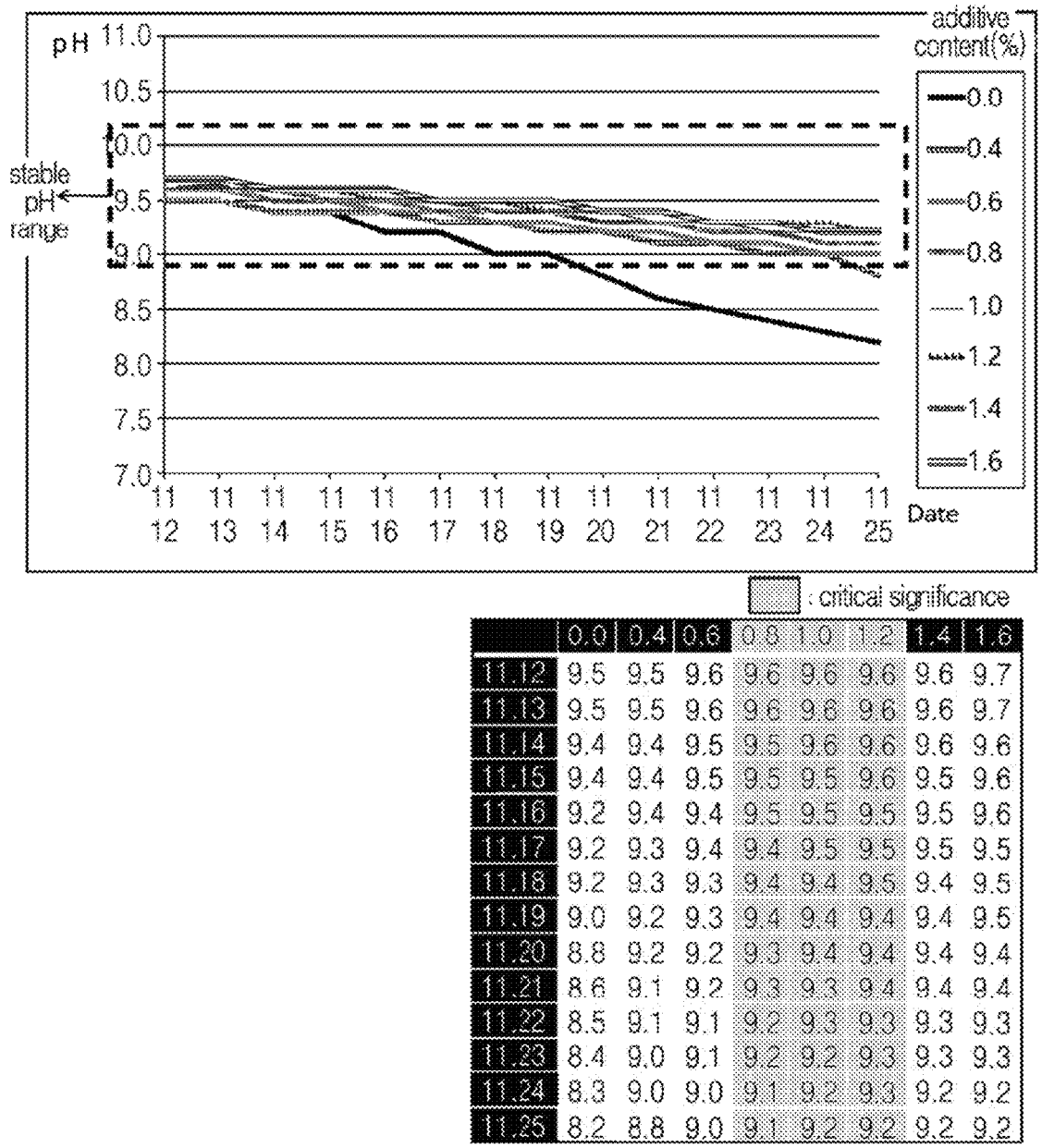
FIG. 6 is a view illustrating a graph and a table, the graph on the left illustrating a change in pH according to time course of lubricants according to Comparative Example and Examples, and the table on the right illustrating the change in pH according to time course of lubricants according to Comparative Example and Examples.

For Comparative Example 3 and Examples 15 to 21, measurement of anti-decomposition performance was performed using bacteria and fungi, and the results are shown in FIGS. 5 and 6. After a fixed amount of used oil (1 ml) was placed into a bacteria/fungi culture medium kit, emulsion was spread using a spreader and then placed into a shaking incubator to incubate bacteria at 35° C. After 48 hours, bacteria/fungi occurrence was measured, and the anti-decomposition performance was evaluated through the number of dots. Referring to FIG. 6, it can be seen that pH was stabilized when using an anti-decomposition agent. In particular, it can be seen that even if the anti-decomposition agent was added in an amount of equal to or greater than 1.2% by weight, this did not affect the change in pH.

Referring to FIG. 5, it can be seen that bacteria and fungi did not occur when the anti-decomposition agent was added in an amount of equal to or greater than 0.8% by weight.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A composition of a lubricant for cold pilgering of zirconium alloy cladding tubes, the composition comprising:
   from about 54% to about 55% by weight of water;
   about 8.5% by weight of a base oil;
   from 2.2 to 2.6% by weight of a lubricity enhancer;
   from 1.2% to less than 1.6% by weight of an anti-wear agent; and
   from 0.8 to 1.2% by weight of an anti-decomposition agent,
   wherein the lubricity enhancer is a Brazil wax;
   wherein the base oil is different from the lubricity enhancer;
   wherein the anti-wear agent is selected from the group consisting of benzenesulfonic acid, $C_{10}$ to $C_{16}$ alkyl groups, calcium salts, sulfuric acid, $C_{16}$ to $C_{24}$ alkyl derivatives, and combinations thereof; and
   wherein the anti-decomposition agent is selected from the group consisting of 1,2-benzisothiazolin-3-one, potassium hydroxide, sodium hydroxide, ethylene glycol, and combinations thereof.

2. The composition of claim 1, further comprising about 16 wt. % of a fatty acid, wherein the fatty acid is different from the base oil and from the lubricity enhancer.

3. The composition of claim 2, further comprising about 4.7% by weight of a pH enhancer.

4. The composition of claim 3, further comprising about 4% by weight of a viscosity modifier.

5. The composition of claim 4, further comprising at least one additive selected from the group consisting of corrosion inhibitors, natural animal fats, and animal fatty acid esters, wherein the natural animal fats are different from the base oil, the lubricity enhancer, and the fatty acid.

6. The composition of claim 5, comprising about 7.6% by weight of the at least one additive.

* * * * *